Patented Dec. 19, 1933

1,940,031

UNITED STATES PATENT OFFICE 1,940,031

PROCESS OF TREATING CHEESE

Joel Taub, Jackson Heights, N. Y.

No Drawing. Application November 20, 1931
Serial No. 576,432

13 Claims. (Cl. 99—11)

This invention relates to improvements in the process of making cheese and to products of which cheese is the major constituent.

In the manufacture of cheese it is well known that certain approximately neutral salts may be used as ingredients for facilitating the fusion of cheese. These ingredients are commonly known as "emulsifiers", which act to peptize the proteins in the cheese. Several of these emulsifiers are salts of citric, tartaric and phosphoric acids.

Heretofore, the emulsifying agents which have been used were obtained by trial and error and not by the application of theory. For example, the clue to the use of phosphates as emulsifying agents was obtained, so far as applicant is aware, from an analysis of imported, packaged Swiss cheese, which indicated from the high ash content of the cheese the use of inorganic salts. The low bacterial content of this cheese further indicated that it had been heated. The number of these emulsifying agents which are known in the processed cheese industry are limited in view of a lack of a basic theory of the action and properties of the various neutral salts on cheese.

The present invention, however, by means of the application of theory has opened a wide range of salts which may be used as emulsifiers. According to this invention the most salubrious emulsifying effect on cheese has been found to be exerted by neutral salts of hydroxy acids, i. e., salts of acids which contain an hydroxyl (OH) radical. In accordance with the teachings of the present invention, any approximately neutral salt of substantially soluble nature of a mono or poly basic acid containing one or more hydroxyl radicals will act as an emulsifier, some acting more effectively than others.

Several salts of hydroxy acids which have been used with satisfactory results are the approximately neutral sodium or ammonium salts of mucic, lactic and malic acids. Of course, instead of the sodium or ammonium salts, any other base, such as potassium, or lithium may be used. From the foregoing it may be seen that any skilled chemist can create a whole series of acids having the combination of acid and basic qualities hereinabove mentioned which can be used as emulsifiers.

In practicing one particular method of making cheese in which this invention is employed, two per cent of an approximately neutral sodium salt of mucic acid is dissolved or suspended in water. To this salt comminuted cheese is added, either with or without condiments or ingredients. These ingredients are preferably added to the mixture before the application of heat is commenced. The entire mixture is then heated until the mass becomes smooth and glossy, which occurs at a temperature depending upon the age and curing of the cheese. In most cases this temperature will be about 140° F. The semifluid cheese is then poured into moulds and containers for cooling. The product is an improved processed cheese or cheese product.

It should be understood that as little as one per cent or as much as four per cent of the emulsifier may be added to the mixture, the amount of the emulsifier to be used being determined during the heating or cooking process, or by previous experience. If it is found that the initial quantity of the emulsifier is insufficient to obtain a desired glossy or smooth condition, then additional emulsifier is added; usually, two per cent is sufficient.

In carrying out another method of making cheese, two per cent of an approximately neutral ammonium salt of lactic acid was used together with a small amount of water. The entire mixture of cheese and neutral salt was then heated to about 150° F.

In still another method two per cent of an approximately neutral ammonium salt of malic acid was employed with excellent results.

Such evidence as is available regarding the theory upon which this invention is based indicates that the protein in the cheese is both acid and basic in character and that it can combine with acids and bases. In using an approximately neutral salt of an hydroxy acid, the salt combines with both the acid and basic radicals of the protein in the cheese, forming a compact structure holding within its boundaries the constituents of the cheese other than the protein, such as fat, moisture, salts, etc. This action is aided by the application of heat.

While the above is believed to be a correct explanation of the principles underlying this invention, further investigation may lead to a modification of this theory. It is to be understood, however, that the invention is independent of any theory which may be advanced to account for the results obtained.

It is also to be understood that the scope of this invention is not limited to the precise details of the processes outlined above since these details may be varied to suit individual requirements and still be within the spirit of the present invention, which should be construed as broadly as possible consistent with the state of the art.

What is claimed is:

1. The improvement in the art of treating cheese which consists in adding during the process a quantity from 1% to 4% of an approximately neutral edible salt of an organic acid containing an hydroxyl radical, excepting citric and tartaric acids.

2. The improvement in the art of treating cheese which consists in adding during the process a quantity from 1% to 4% of an approximately neutral salt of an organic poly basic acid containing only one hydroxyl radical, excepting citric acid.

3. The improvement in the art of treating cheese which consists in adding during the process a quantity from 1% to 4% of an approximately neutral salt of an organic poly basic acid containing more than one hydroxyl radical, excepting tartaric acid.

4. The improvement in the art of treating cheese which comprises adding during the process a quantity from 1% to 4% of an approximately neutral sodium salt of mucic acid.

5. The improvement in the art of treating cheese which comprises adding during the process a quantity of about 2% of an approximately neutral sodium salt of mucic acid.

6. The improvement in the art of treating cheese which comprises adding during the process a quantity from 1% to 4% of an approximately neutral ammonium salt of lactic acid.

7. The improvement in the art of treating cheese which comprises adding during the process a quantity of about 2% of an approximately neutral ammonium salt of lactic acid.

8. The improvement in the art of treating cheese which comprises adding during the process a quantity from 1% to 4% of an approximately neutral ammonium salt of malic acid.

9. The improvement in the art of treating cheese which comprises adding during the process a quantity of about 2% of an approximately neutral ammonium salt of malic acid.

10. The improvement in the art of treating cheese which consists in adding during the process a quantity from 1% to 4% of an approximately neutral edible salt of an organic hydroxy acid in which the hydroxy and acid groups are not equal in number, excepting citric acid.

11. The improvement in the art of treating cheese which consists in adding during the process a quantity from 1% to 4% of an approximately neutral salt of a mono basic organic acid containing a mono hydroxy radical.

12. The process of treating cheese which consists in adding during the process a small percentage of a substantially neutral edible salt of an organic acid chosen from the group which consists of malic, mucic and lactic acids, said percentage not substantially exceeding 4% and not being substantially less than 1%.

13. A product comprising cheese and from substantially 1% to 4% by weight of a substantially neutral edible salt of an organic acid selected from the group which consists of malic, mucic and lactic acids.

JOEL TAUB.

DISCLAIMER 1,940,031.—*Joel Taub*, Jackson Heights, N. Y. PROCESS OF TREATING CHEESE. Patent dated December 19, 1933. Disclaimer filed June 1, 1935, by the patentee.

Hereby enters this disclaimer relative to claims 1, 3, 4, 5, 10, 12, and 13 of said Letters Patent, to wit:

"4. The improvement in the art of treating cheese which comprises adding during the process a quantity from 1% to 4% of an approximately neutral sodium salt of mucic acid.

"5. The improvement in the art of treating cheese which comprises adding during the process a quantity of about 2% of an approximately neutral sodium salt of mucic acid."

Only that much of the improvement in the art of treating cheese set forth in claims 1, 3, 10, and 12 which includes using a neutral salt of mucic acid.

And the product of claim 13 which includes mucic acid.

[*Official Gazette July 2, 1935.*]

What is claimed is:

1. The improvement in the art of treating cheese which consists in adding during the process a quantity from 1% to 4% of an approximately neutral edible salt of an organic acid containing an hydroxyl radical, excepting citric and tartaric acids.

2. The improvement in the art of treating cheese which consists in adding during the process a quantity from 1% to 4% of an approximately neutral salt of an organic poly basic acid containing only one hydroxyl radical, excepting citric acid.

3. The improvement in the art of treating cheese which consists in adding during the process a quantity from 1% to 4% of an approximately neutral salt of an organic poly basic acid containing more than one hydroxyl radical, excepting tartaric acid.

4. The improvement in the art of treating cheese which comprises adding during the process a quantity from 1% to 4% of an approximately neutral sodium salt of mucic acid.

5. The improvement in the art of treating cheese which comprises adding during the process a quantity of about 2% of an approximately neutral sodium salt of mucic acid.

6. The improvement in the art of treating cheese which comprises adding during the process a quantity from 1% to 4% of an approximately neutral ammonium salt of lactic acid.

7. The improvement in the art of treating cheese which comprises adding during the process a quantity of about 2% of an approximately neutral ammonium salt of lactic acid.

8. The improvement in the art of treating cheese which comprises adding during the process a quantity from 1% to 4% of an approximately neutral ammonium salt of malic acid.

9. The improvement in the art of treating cheese which comprises adding during the process a quantity of about 2% of an approximately neutral ammonium salt of malic acid.

10. The improvement in the art of treating cheese which consists in adding during the process a quantity from 1% to 4% of an approximately neutral edible salt of an organic hydroxy acid in which the hydroxy and acid groups are not equal in number, excepting citric acid.

11. The improvement in the art of treating cheese which consists in adding during the process a quantity from 1% to 4% of an approximately neutral salt of a mono basic organic acid containing a mono hydroxy radical.

12. The process of treating cheese which consists in adding during the process a small percentage of a substantially neutral edible salt of an organic acid chosen from the group which consists of malic, mucic and lactic acids, said percentage not substantially exceeding 4% and not being substantially less than 1%.

13. A product comprising cheese and from substantially 1% to 4% by weight of a substantially neutral edible salt of an organic acid selected from the group which consists of malic, mucic and lactic acids.

JOEL TAUB.

DISCLAIMER 1,940,031.—*Joel Taub*, Jackson Heights, N. Y. Process of Treating Cheese. Patent dated December 19, 1933. Disclaimer filed June 1, 1935, by the patentee.

Hereby enters this disclaimer relative to claims 1, 3, 4, 5, 10, 12, and 13 of said Letters Patent, to wit:

"4. The improvement in the art of treating cheese which comprises adding during the process a quantity from 1% to 4% of an approximately neutral sodium salt of mucic acid.

"5. The improvement in the art of treating cheese which comprises adding during the process a quantity of about 2% of an approximately neutral sodium salt of mucic acid."

Only that much of the improvement in the art of treating cheese set forth in claims 1, 3, 10, and 12 which includes using a neutral salt of mucic acid.

And the product of claim 13 which includes mucic acid.

[*Official Gazette July 2, 1935.*]